United States Patent
Laufenberg et al.

(10) Patent No.: US 6,929,574 B2
(45) Date of Patent: Aug. 16, 2005

(54) BELT DRIVE TWO SPEED SHIFT MECHANISM

(75) Inventors: Nicholas J. Laufenberg, Darien, IL (US); Peter J. Ungs, Bolingbrook, IL (US)

(73) Assignee: CNH America LLC, Racine, WI (US)

( * ) Notice: Subject to any disclaimer, the term of this patent is extended or adjusted under 35 U.S.C. 154(b) by 0 days.

(21) Appl. No.: 10/838,027

(22) Filed: May 3, 2004

(65) Prior Publication Data

US 2004/0204273 A1 Oct. 14, 2004

Related U.S. Application Data

(62) Division of application No. 10/195,723, filed on Jul. 15, 2002, now Pat. No. 6,773,367.

(51) Int. Cl.[7] .......................... F16H 61/00; F16H 59/00
(52) U.S. Cl. .............................. 474/70; 474/73; 56/10.3
(58) Field of Search ..................... 474/70, 148, 73–74, 474/84–88; 74/336 R; 56/10.2–10.4, 14.2–14.5, 16.4–16.6; 460/12, 112, 99; 292/202; 414/523; 188/72.2; 180/68.1, 68, 89.7

(56) References Cited

U.S. PATENT DOCUMENTS

| | | | |
|---|---|---|---|
| 93,633 A | | 8/1869 | McFarland et al. |
| 546,703 A | | 9/1895 | Lippy et al. |
| 721,739 A | | 3/1903 | Porter |
| 2,463,100 A | * | 3/1949 | Gredell .......................... 474/70 |
| 2,641,137 A | * | 6/1953 | Orcutt et al. .................. 474/70 |
| 2,651,246 A | * | 9/1953 | Peters et al. ................... 172/59 |
| 2,694,937 A | * | 11/1954 | Birbaum .................... 74/336 R |
| 2,807,172 A | * | 9/1957 | Jacobs ........................ 74/336.5 |
| 3,362,144 A | * | 1/1968 | Bumgardner ................ 56/10.3 |
| 4,276,037 A | * | 6/1981 | Ryan et al. ..................... 474/70 |
| 4,339,014 A | * | 7/1982 | Berth et al. ................. 180/68.1 |
| 4,545,719 A | * | 10/1985 | Busboom ..................... 414/523 |
| 4,943,268 A | * | 7/1990 | Eisenmann et al. ........... 475/95 |
| 5,827,143 A | | 10/1998 | Monahan et al. .............. 474/73 |
| 5,871,412 A | | 2/1999 | Moser .......................... 474/76 |
| 6,082,513 A | | 7/2000 | Li .............................. 192/56.1 |

FOREIGN PATENT DOCUMENTS

FR          2274829 A1 * 1/1976 ........... F16D/13/10

* cited by examiner

*Primary Examiner*—Marcus Charles
(74) *Attorney, Agent, or Firm*—Brant T. Maurer; Rebecca Henkel

(57) ABSTRACT

A two speed shift mechanism for a belt drive that includes a rotatable shaft with a first pulley, and a tube concentric with the shaft and rotatable therearound. The tube includes a shift hub supporting a second pushy in axially spaced relation to the first pulley for concentric rotation about the shift hub. The mechanism further includes a collar mounted around the shift hub for rotation therewith and for axial movement between a position adjacent the first pulley and a position adjacent the second pulley. In a first position, the collar and the first pulley include elements engageable for connecting the collar to the first pulley for rotation of the collar, the shift hub, and the tube. In a second position, the collar and the second pulley include elements engageable for connecting the collar to the second pulley for rotation of the collar, the shift hub, and the tube.

8 Claims, 5 Drawing Sheets

_US 6,929,574 B2_

BELT DRIVE TWO SPEED SHIFT MECHANISM

CROSS REFERENCE TO RELATED APPLICATIONS

This Patent Application is a Divisional of, and claims priority to under 35 U.S.C. §120, U.S. patent application Ser. No. 10/195,723, filed on Jul. 15, 2002 now U.S. Pat. No. 6,773,367 entitled, "Belt Drive Two Speed Shift Mechanism" and having Nicholas J. Laufenberg and Peter J. Ungs as the Inventors. The full disclosure of U.S. patent application Ser. No. 10/195,723 is hereby fully incorporated by reference.

TECHNICAL FIELD

This invention relates generally to a belt drive two speed shift mechanism for a rotatably driven device such as a crop residue chopper of an agricultural combine, and more particularly, to a belt drive shift mechanism which allows conveniently and easily manually shifting between two drive ratios by moving a shift collar between a position engaged with a first pulley to be driven by a belt at one rotational speed, and a second pulley to be driven by a belt at another speed.

BACKGROUND ART

Commonly, it is desired to have the capability to change the speed of rotation of belt driven items on agricultural combines, such as crop residue choppers and the like. Typically to accomplish this, a tensioning mechanism for the belt or belts must be disengaged or released. The belt or belts must then be moved from one set of pulleys to a second set of pulleys. Then, the belt tension mechanism must be re-engaged. Belt tension on such drives is typically relatively high and thus a mechanical advantage device, such as a relatively long lever arm, is utilized to engage and disengage the tension mechanism. Moving the belt or belts can be difficult due to the length of the belts, and/or the location thereof.

Thus, what is sought is a belt drive shift mechanism for rotatable items on agricultural machines such as combines and the like, which eliminates the need for engaging and disengaging the belt tension mechanism, and physically moving the belt or belts from one set of pulleys to another.

SUMMARY OF THE INVENTION

According to the present invention, a two speed shift mechanism for a belt drive which provides many of the above sought properties, is disclosed. The present mechanism includes a rotatable shaft including a first pulley mounted thereon for rotation therewith, a tube concentric with the shaft and rotatable therearound, the tube including a shift hub mounted around a portion thereof for rotation therewith, and the shift hub supporting a second pulley in axially spaced relation to the first pulley for concentric rotation about the shift hub. The mechanism includes a shift collar mounted around the shift hub in the space between the first pulley and the second pulley for rotation with the shift hub and for axial movement relative thereto between a first position adjacent the first pulley and a second position adjacent the second pulley. The collar and the first pulley include elements cooperatively engageable when the collar is in the first position for connecting the collar to the first pulley for rotation of the collar, the shift hub and the tube therewith, and the collar and the second pulley include elements cooperatively engageable when the collar is in the second position for connecting the collar to the second pulley for rotation of the collar, the shift hub, and the tube therewith, the mechanism further optionally including a releasable element for holding the collar in the first and second positions, respectively.

To selectably shift from one belt drive to the other, the collar is simply an easily released and moved to the position for engaging the other belt and locked in position. No physical movement of the belts is required, nor is releasing and re-engaging a tensioner.

DETAILED DESCRIPTION OF THE INVENTION

Figure 1:
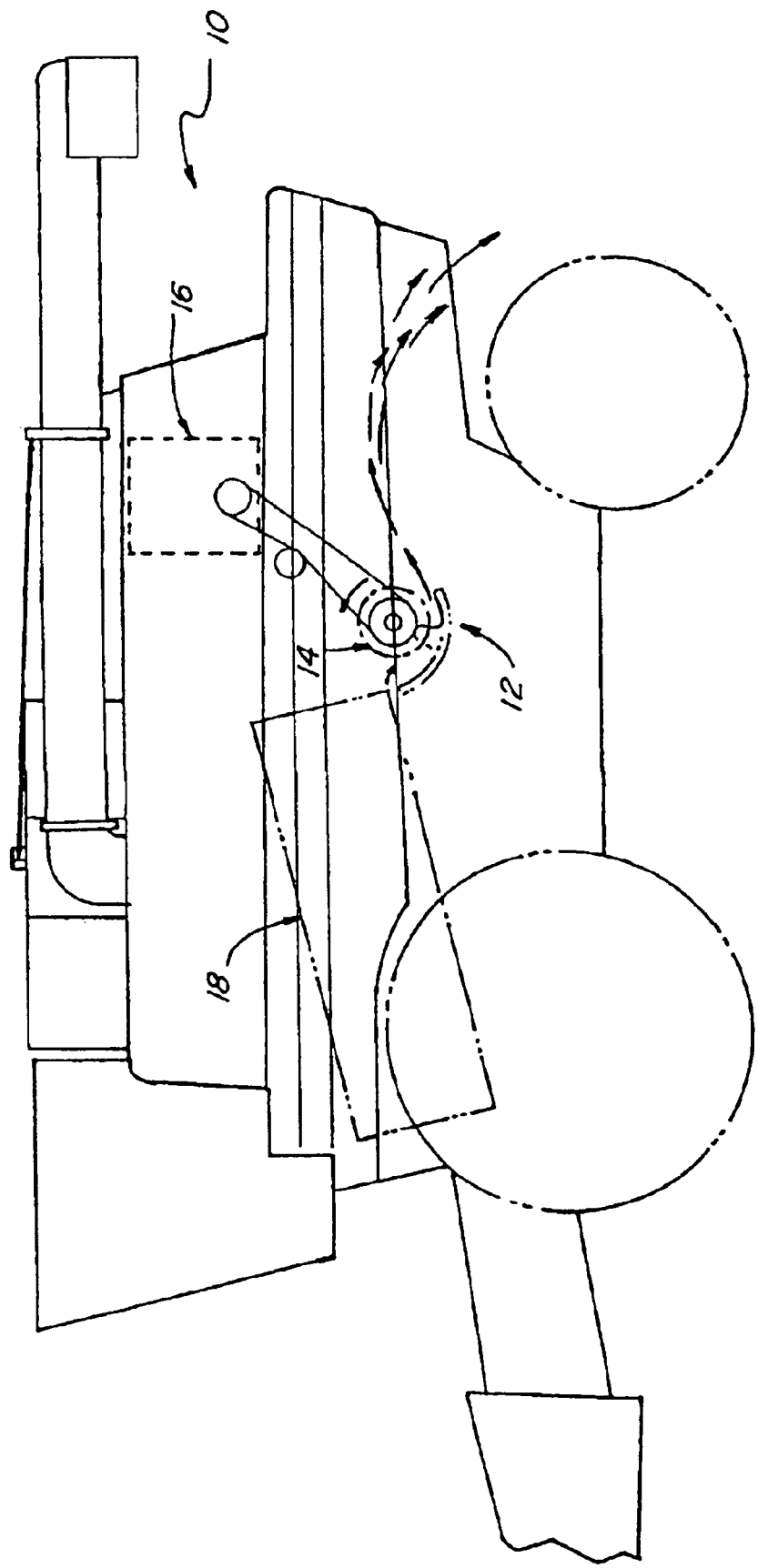
FIG. 1 is a simplified side view of an agricultural combine including a belt drive two speed shift mechanism according to the invention.

Referring now to the drawings, wherein a preferred embodiment of the present invention is shown, in FIG. 1, a typical prior art self-propelled agricultural combine 10 is shown, including a belt drive two speed shift mechanism 12 constructed and operable according to the teachings of the present invention. Mechanism 12 is shown operatively connected between a rotary straw chopper 14 and a rotatable power source 16, such as an internal combustion engine or the like, for rotatably driving chopper 14 for receiving straw and other crop residue from a threshing mechanism 18 and cutting, chopping and propelling the residue rearwardly and outwardly from combine 10 as shown by the arrows.

Shift mechanism 12 of the present invention is provided to allow selecting the rotational speed of chopper 14 for a particular crop being harvested by combine 10, a high speed typically being selected for chopping crop residue from crops such as grasses and beans, and a low speed being selected for corn, certain knives typically being removed from chopper 14 for handling corn residue, due to difficulty of cutting corn cobs which are relatively hard.

Figure 2:
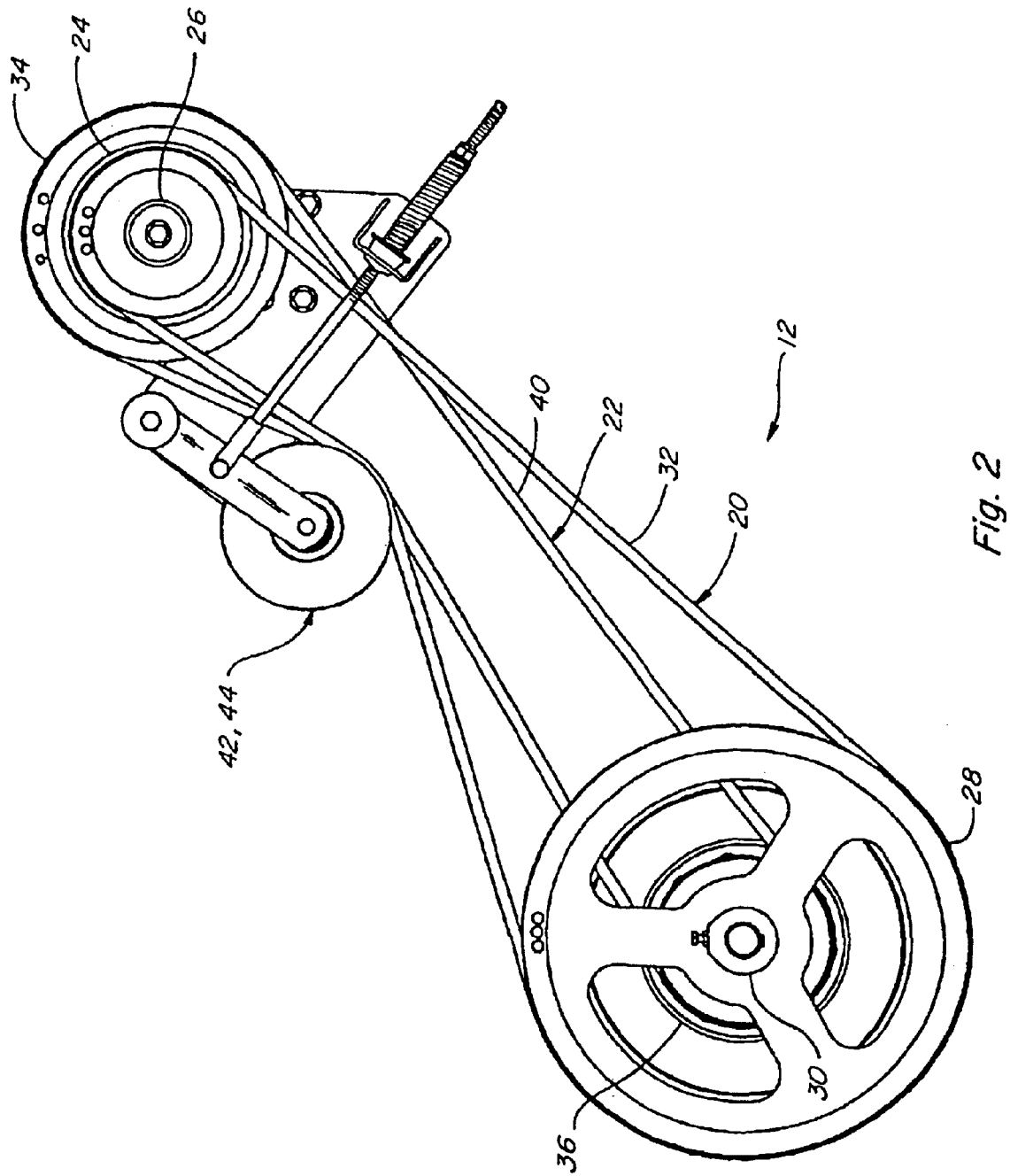
FIG. 2 is an enlarged side view of the mechanism of FIG. 1.

Referring also to FIG. 2, shift mechanism 12 is shiftable between a low speed belt drive 20 and a high speed belt drive 22. Belt drive 20 includes a low speed drive pulley 24 mounted on a rotatably drivable shaft 26 of power source 16, a low speed driven pulley 28 mounted on a shaft 30 for rotation therewith, and an endless belt 32 which encircles pulleys 24 and 28. Belt drive 22 includes a high speed drive pulley 34 also mounted to shaft 26 for rotation therewith, a high speed driven pulley 36 mounted for rotation on a shift hub 38 (FIG. 3), and an endless belt 40 which encircles pulleys 34 and 36. A pair of belt tensioners 42, 44 are positioned in contact with belts 32 and 40, respectively, for tensioning the belts in the well known manner.

Figure 3:
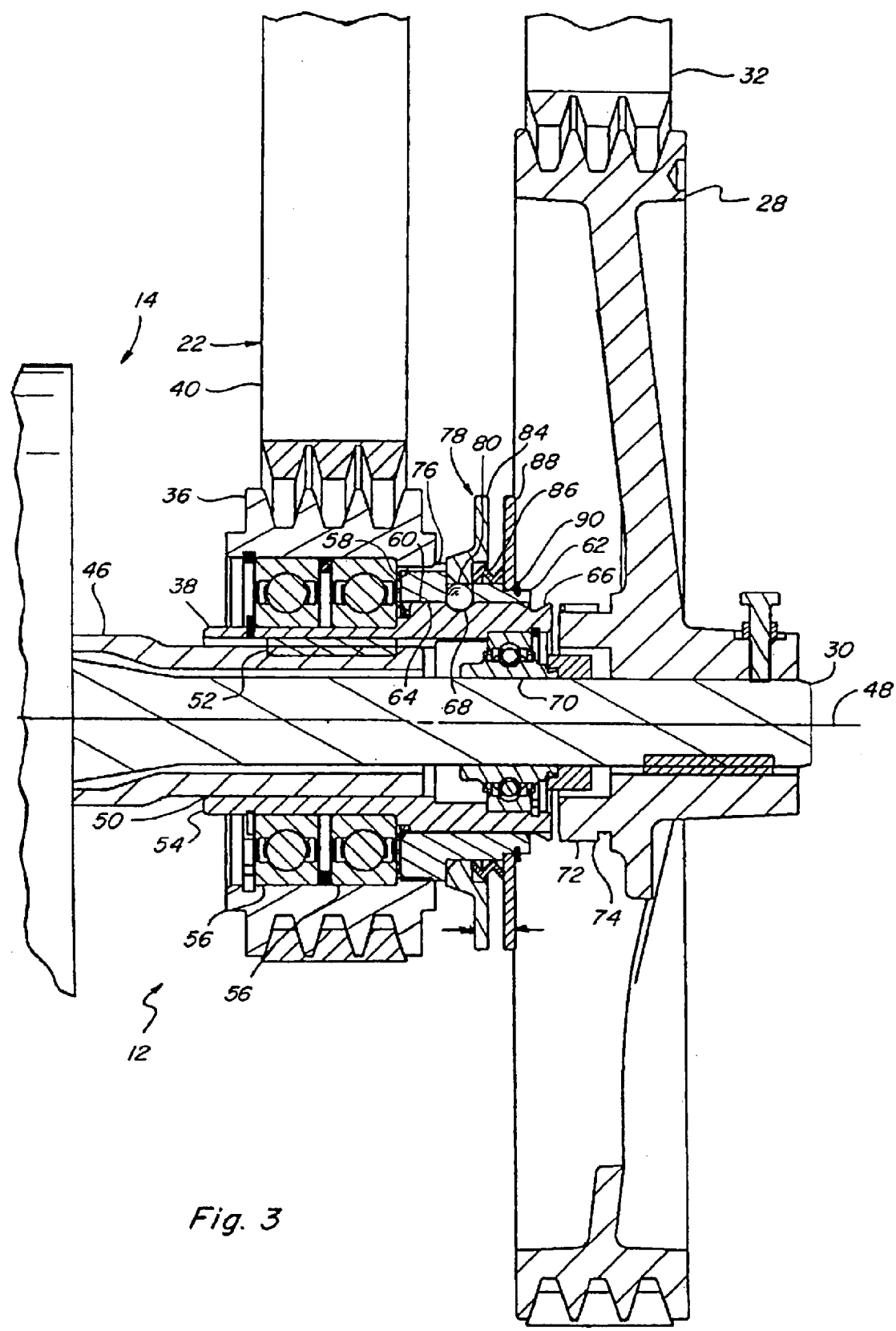
FIG. 3 is a fragmentary sectional end view of the mechanism of FIG. 1 showing a shift collar thereof in a high speed position.

Referring also to FIG. 3, chopper 14 includes a central tube 46 which comprises an element of chopper 14 rotatable about a rotational axis 48 and carrying knives for cutting and chopping crop residue received from threshing mechanism 18 (FIG. 1) in the well known manner. Tube 46 is suitably supported on support bearings (not shown) also in the conventional manner, and is coaxial about rotational axis 48 with shaft 30 which extends through the hollow cavity of tube 46 as illustrated. Shift hub 38 is an annular member having an axial hole 50 therethrough which receives shaft 30 and the end of tube 46, shift hub 38 being mounted to tube 46 by a key 52 for rotation therewith. High speed driven pulley 36 is mounted for rotation around an end 54 of shift hub 38 on a pair of bearings 56. Pulley 36 includes an internal splined element 58 which extends around an outer cylindrical splined element 60 on shift hub 38 opposite end 54 in radially outwardly spaced relation thereto. An annular shift collar 62 is mounted around outer cylindrical splined element 60 of shift hub 38 and includes an inner cylindrical splined element 64 cooperatively engaged with splined element 60 such that shift collar 62 is rotated with shift hub 38 and is axially movable over splined element 60. Shift hub 38 includes a plurality of detent receptacles 66 in splined element 60 at angularly spaced locations around rotational axis 48 at an axial position adjacent pulley 28, and a plurality of detent receptacles 68 in splined element 60 at angularly spaced locations around axis 48 at an axial position adjacent pulley 36. The end of shift hub 38 opposite end 50 is supported for rotation around shaft 30 by a bearing 70. Pulley 28 includes an outer cylindrical splined element 72 around an axial end of a hub 74 thereof adjacent to shift hub 38, splined element 72 corresponding diametrically and in spline size and frequency to splined element 60 of hub 38 so as to essentially form a separate continuation thereof.

Shift collar 62 is axially positionable in a high speed position (FIG. 3) wherein an outer cylindrical splined element 76 extending around an end of shift collar 62 adjacent pulley 36 is cooperatively engaged with internal splined element 58 of pulley 36, thereby connecting pulley 36, shift collar 62, shift hub 38 and tube 46 together for joint rotation by high speed drive 22.

Figure 4:
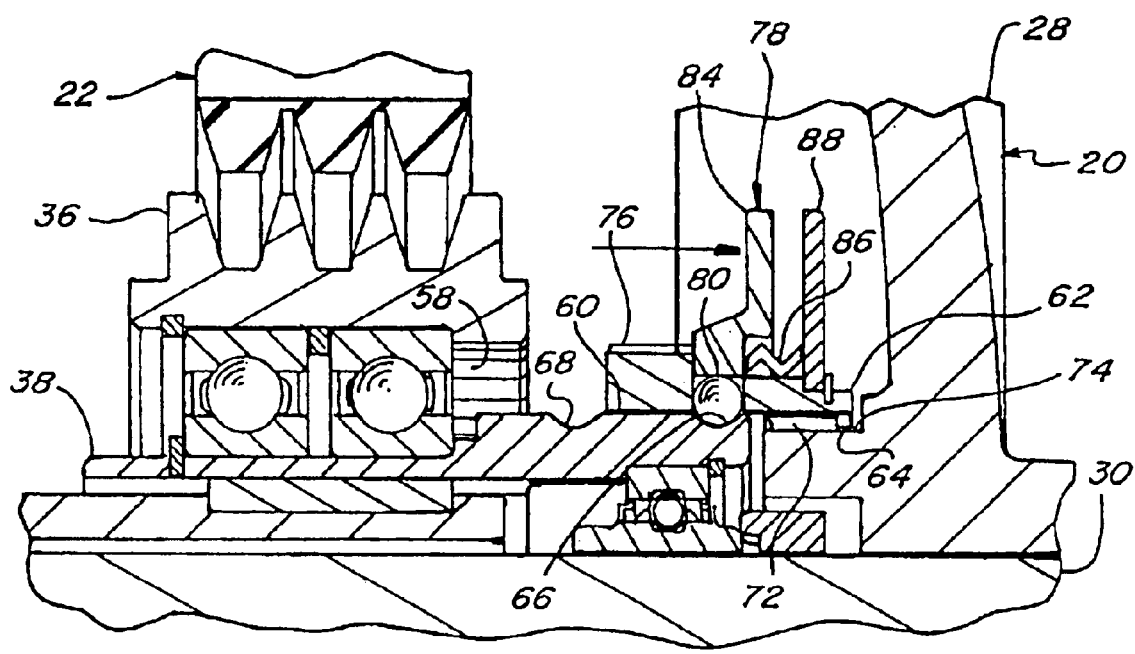
FIG. 4 is a fragmentary sectional view of the mechanism of FIG. 2 showing the shift collar in a low speed position.

Referring also to FIG. 4, shift collar 62 is rotatable with shift hub 38 and axially movable therealong from the high speed position (FIG. 3) in telescopic relation to hub 38, as denoted by the arrow in FIG. 4, so as to extend over hub 74 of pulley 28, such that inner splined element 64 of shift collar 62 is cooperatively engaged with outer splined element 72 of pulley 28, thereby joining together pulley 28, shift hub 38 and tube 46 for joint rotation by low speed belt drive 20.

Figure 5:
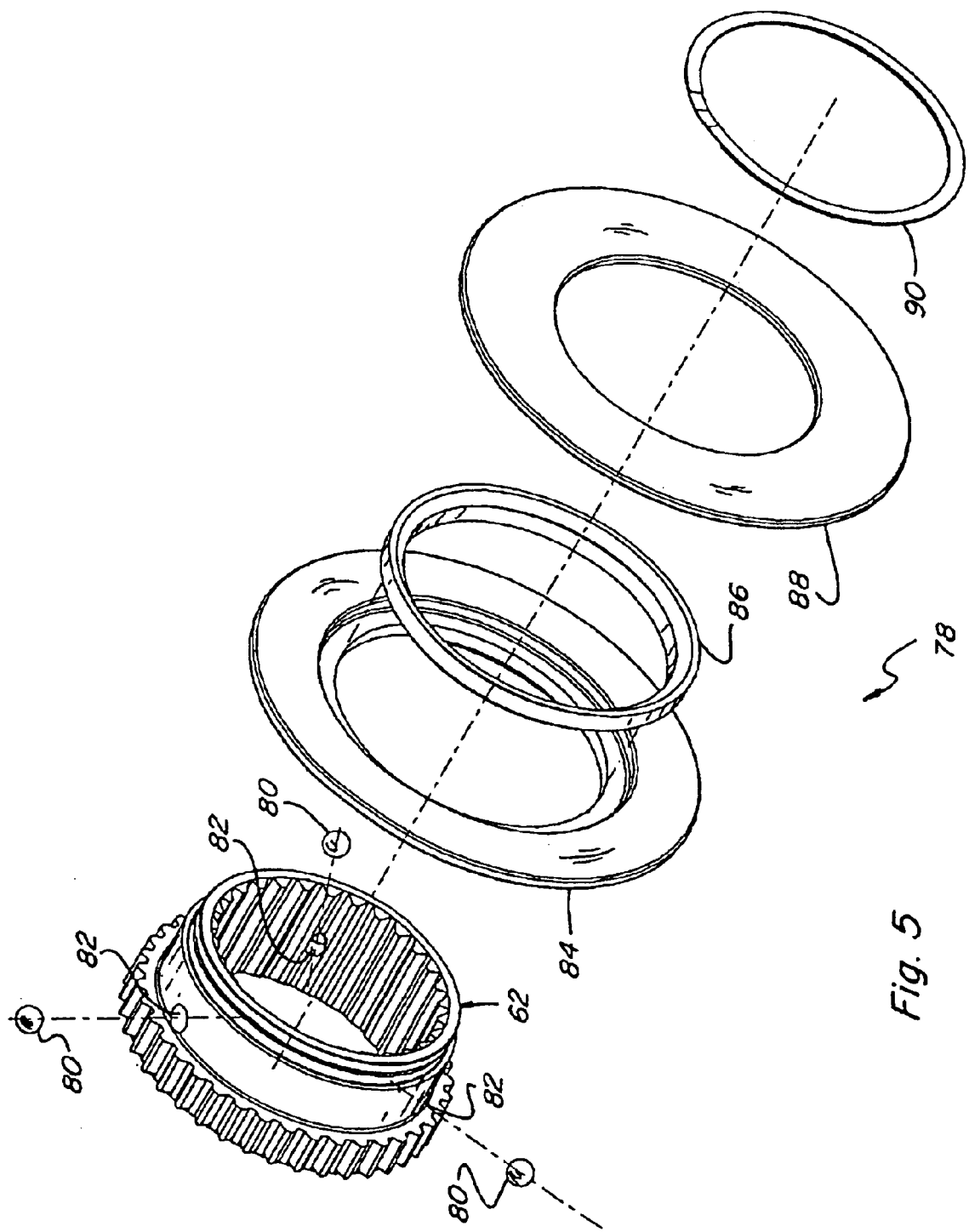
FIG. 5 is an exploded view of the shift collar.

Referring also to FIG. 5, shift collar 62 preferably includes a detent mechanism 78 for releasably holding it in the high speed and low speed positions, respectively. Detent mechanism 78 preferably includes a plurality of detent balls 80 receivable in holes 82 at angularly spaced locations around collar 62 corresponding to the angular spaced locations of receptacles 66 and 68 on shift hub 38. Balls 80 are retained in position in holes 82 by an annular sliding plate 84, which in turn, is held in position by a release assembly including an annular spring 86, an annular fixed plate 88, and a retainer ring 90, sliding plate 84, spring 86, fixed plate 88, and retainer ring 90 extending around shift collar 62 as shown in FIGS. 3 and 4.

To release shift collar 62, sliding plate 84 is squeezed toward fixed plate 88 to release balls 80, as denoted by the opposing arrows in FIG. 3. Shift collar 62 is now quickly and easily manually movable axially between the high and low speed positions (FIGS. 3 and 4, respectively) for allowing selecting high or low speed operation, as desired. Once in a selected position, balls 80 will be received in the corresponding receptacles 66 or 68 for holding shift collar 62 in the selected position. Desirably, no releasing of tensioner 42 or 44 is required, no moving of the belt or belts is required, and the shifting can be accomplished easily from the side of the combine.

Here, its should be noted that the locations of the high speed driven pulley and the low speed driven pulley could be reversed, as desired, and that any desired drive ratios could be used for the respective drives, as desired. Additionally, the connotations in the claims to "first" and "second" are not intended to be limited to a particular speed drive.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A shiftable two-speed drive for a crop residue chopper of an agricultural combine, comprising:

a first drive pulley connected in rotatably driven relation to a rotatable power source on the combine, a shaft adjacent to the chopper rotatable about an axis therethrough including a first driven pulley mounted on the shaft for rotation therewith, and an endless belt encircling the first drive and driven pulleys;

a second drive pulley connected in rotatably driven relation to the rotatable power source on the combine for rotation therewith, a tube concentric with the shaft and rotatable around the shaft and the axis, the tube being rotatable for rotating the chopper, and the tube including a shift hub mounted around a portion thereof for rotation therewith, the shift hub supporting a second drive pulley in axially spaced relation to the first driven pulley for concentric rotation about the shift hub, and an endless belt encircling the second drive and driven pulleys; and a shift collar mounted around the shift hub in the space between the first driven pulley and the second driven pulley for rotation with the shift hub and for axial movement relative thereto between a position adjacent the first driven pulley and a position adjacent the second pulley, the collar and the first driven pulley including elements cooperatively engageable when the collar is in the position adjacent to the first driven pulley for connecting the collar to the first driven pulley for rotation of the collar, the shift hub and the tube therewith, and the collar and the second driven pulley including elements cooperatively engageable when the collar is in the position adjacent to the second driven pulley for connecting the collar to the second driven pulley for rotation of the collar, the shift hub, and the tube therewith.

2. The drive of claim 1, wherein the elements on the collar and on the first driven pulley comprise mating splines.

3. The drive of claim 1, wherein the elements on the collar and on the second driven pulley comprise mating splines.

4. The drive of claim 1, wherein the collar and the shift hub include elements cooperatively engageable for holding the collar in the respective positions thereof.

5. The drive of claim 1, further comprising a tensioner for maintaining each of the belts at a desired tension.

6. The drive of claim 1, wherein the collar comprises at least one detent element cooperatively receivable in receptacles on the shift hub when the collar is in the respective positions thereof, for releasably holding the collar therein, and a release element for releasably holding the detent element in the receptacles when the collar is in the positions, respectively.

7. The drive of claim 6, wherein the release element is manually movable for releasing the detent elements to allow moving the collar between the positions thereof.

8. The drive of claim 6, wherein the at least one detent element comprises a ball.

* * * * *